United States Patent
Oi et al.

(10) Patent No.: US 10,352,382 B2
(45) Date of Patent: Jul. 16, 2019

(54) BICYCLE DISC BRAKE ROTOR

(71) Applicant: Shimano Inc., Sakai-shi, Osaka (JP)

(72) Inventors: Takeshi Oi, Sakai (JP); Masanori Taniguchi, Sakai (JP); Toru Iwai, Sakai (JP); Masahiro Nakakura, Sakai (JP); Noriko Masuta, Sakai (JP); Yusuke Hosomi, Sakai (JP)

(73) Assignee: Shimano Inc., Sakai-shi, Osaka (JP)

(*) Notice: Subject to any disclaimer, the term of this patent is extended or adjusted under 35 U.S.C. 154(b) by 0 days.

(21) Appl. No.: 15/221,454

(22) Filed: Jul. 27, 2016

(65) Prior Publication Data

US 2018/0031061 A1 Feb. 1, 2018

(51) Int. Cl.
*F16D 65/02* (2006.01)
*F16D 65/12* (2006.01)

(52) U.S. Cl.
CPC ...... *F16D 65/127* (2013.01); *F16D 2065/132* (2013.01); *F16D 2200/003* (2013.01); *F16D 2200/0017* (2013.01); *F16D 2200/0026* (2013.01)

(58) Field of Classification Search
CPC ........ F16D 55/00; F16D 65/025; F16D 65/12; F16D 65/125; F16D 2200/00; F16D 2200/0004; F16D 2200/0008; F16D 2200/0013; F16D 2200/0017; F16D 2200/003; F16D 2250/0038; F16D 2250/0046
USPC .................. 188/218 XL, 18 A, 24, 26, 24.11
See application file for complete search history.

(56) References Cited

U.S. PATENT DOCUMENTS

| 2,728,422 | A | * | 12/1955 | Kelley | F16D 65/128 |
| | | | | | 188/218 XL |
| 3,435,935 | A | * | 4/1969 | Warman | F16D 65/125 |
| | | | | | 188/218 XL |
| 4,278,153 | A | * | 7/1981 | Venkatu | F16D 65/122 |
| | | | | | 188/251 M |
| 5,372,222 | A | * | 12/1994 | Rhee | F16D 65/125 |
| | | | | | 188/218 XL |
| 2003/0010585 | A1 | * | 1/2003 | Okada | B62L 1/00 |
| | | | | | 188/251 A |
| 2008/0060891 | A1 | | 3/2008 | Chen et al. | |
| 2011/0278103 | A1 | * | 11/2011 | Moore | F16D 65/12 |
| | | | | | 188/26 |
| 2013/0168193 | A1 | * | 7/2013 | Iwai | F16D 65/12 |
| | | | | | 188/218 XL |
| 2013/0180806 | A1 | * | 7/2013 | Iwai | F16D 65/125 |
| | | | | | 188/26 |

FOREIGN PATENT DOCUMENTS

| DE | 202004005284 U1 | 7/2004 |
| DE | 102012221351 A1 | 5/2013 |
| JP | S55006069 A | 1/1980 |

* cited by examiner

*Primary Examiner* — Robert A. Siconolfi
*Assistant Examiner* — San M Aung
(74) *Attorney, Agent, or Firm* — Alleman Hall Creasman & Tuttle LLP (57) ABSTRACT

A bicycle disc brake rotor, having a rotational center axis, comprises an outer portion having plural layers including first and second braking surfaces in opposite axial directions. The plural layers include a first layer made of a copper or a copper alloy.

16 Claims, 6 Drawing Sheets

BICYCLE DISC BRAKE ROTOR

TECHNICAL FIELD

The present invention relates to a disc brake system, and particularly relates to a bicycle disc brake rotor.

BACKGROUND

Disc brake systems are commonly incorporated into bicycles. Disc brake systems at least include a disc brake rotor. Several materials, such as aluminum, stainless steel, and iron, have been used for a bicycle disc brake rotor.

SUMMARY

In accordance with a first aspect of the invention, the bicycle disc brake rotor has a rotational center axis and comprises an outer portion having plural layers including first and second braking surfaces in opposite axial directions. The plural layers include a first layer made of a copper or a copper alloy. One potential advantage of such a configuration is that heat conductivity is increased and braking surface temperatures decreased compared to embodiments in which the first layer is made of aluminum or aluminum alloy.

In accordance with a second aspect of the invention, the bicycle disc brake rotor according to the first aspect is configured so that the plural layers may further include a second layer and a third layer. One potential advantage of such a configuration is that the structural strength of the outer portion can be increased.

In accordance with a third aspect of the invention, the bicycle disc brake rotor according to the second aspect is configured so that the first layer, the second layer and the third layer may be stacked in this order in the axial direction, the second layer may be made of an aluminum or an aluminum alloy, and the third layer may be made of a copper or a copper alloy. One potential advantage of such a configuration is that the heat conductivity and powerful braking properties of the copper or the copper alloy and the heat dissipation of the aluminum or aluminum alloy are combined.

In accordance with a fourth aspect of the invention, the bicycle disc brake rotor according to the third aspect is configured so that the first braking surface may be provided on the first layer, and the second braking surface may be provided on the third layer. One potential advantage of such a configuration is that the braking surfaces are provided on the copper or the copper alloy, which provide powerful braking properties.

In accordance with a fifth aspect of the invention, the bicycle disc brake rotor according to the third or fourth aspect is configured so that the first layer, the second layer and the third layer may be directly stacked. One potential advantage of such a configuration is that heat dissipation is facilitated.

In accordance with a sixth aspect of the invention, the bicycle disc brake rotor according to any one of the third to fifth aspects is configured so that the second layer may extend in a radial direction of the bicycle disc brake rotor with respect to at least one of the first layer and the third layer to form a fin. One potential advantage of the fin configuration is that the exposed surface area of the outer layer for heat dissipation is increased.

In accordance with a seventh aspect of the invention, the bicycle disc brake rotor according to the sixth aspect is configured so that the disc brake rotor may further comprise an inner portion radially inwardly arranged with respect to the outer portion, the inner portion having a first arm and a second arm coupled to the outer portion respectively. The fin may be arranged between the first arm and the second arm. One potential advantage of this configuration is that the arms are part of the inner portion rather than separate members from the inner portion, thereby reducing the number of manufacturing components.

In accordance with a eighth aspect of the invention, the bicycle disc brake rotor according to any one of the third to seventh aspects is configured so that the outer portion may have a hole extending in the axial direction to expose the second layer. One potential advantage of the hole configuration is that the second layer is exposed to outside air for enhanced heat dissipation.

In accordance with a ninth aspect of the invention, the bicycle disc brake rotor according to the second aspect is configured so that the second layer, the first layer and the third layer may be stacked in this order in the axial direction between the first and second braking surfaces, the second layer may be made of an iron or an iron alloy, and the third layer may be made of an iron or an iron alloy. One potential advantage of such a configuration is that the heat conductivity and powerful braking properties of the copper or the copper alloy and the iron or the iron alloy are combined.

In accordance with a tenth aspect of the invention, the bicycle disc brake rotor according to the ninth aspect is configured so that the first braking surface may be provided on the second layer, and the second braking surface may be provided on the third layer. One potential advantage of such a configuration is that the braking surfaces are provided on the iron or the iron alloy, which provides good braking properties with wear resistance.

In accordance with a eleventh aspect of the invention, the bicycle disc brake rotor according to the ninth or tenth aspect is configured so that the first layer, the second layer and the third layer may be directly stacked. One potential advantage of such a configuration is that heat dissipation is facilitated.

In accordance with a twelfth aspect of the invention, the bicycle disc brake rotor according to any one of the ninth to eleventh aspects is configured so that the first layer may extend in a radial direction of the bicycle disc brake rotor with respect to at least one of the second layer and the third layer to form a fin. One potential advantage of the fin configuration is that the exposed surface area of the outer layer for heat dissipation is increased.

In accordance with a thirteenth aspect of the invention, the bicycle disc brake rotor according to the twelfth aspect is configured so that the disc brake rotor may further comprise an inner portion radially inwardly arranged with respect to the outer portion, the inner portion having a first arm and a second arm coupled to the outer portion respectively. The fin may be arranged between the first arm and the second arm. One potential advantage of this configuration is that the arms are part of the inner portion rather than separate members from the inner portion, thereby reducing the number of manufacturing components In accordance with a fourteenth aspect of the invention, the bicycle disc brake rotor according to any one of the ninth to thirteenth aspects is configured so that the outer portion may have a hole extending to the axial direction to expose the first layer. One potential advantage of the hole configuration is that the first layer is exposed to outside air for enhanced heat dissipation.

In accordance with a fifteenth aspect of the invention, the bicycle disc brake rotor according to any one of the above aspects is configured so that the first layer may be 0.5 to 3 mm thick. One potential advantage of such a configuration is that the heat conductivity properties and braking properties of the first layer are optimized without adding too much weight to the outer portion.

In accordance with a sixteenth aspect of the invention, the bicycle disc brake rotor according to any one of the above aspects is configured so that the plural layers may each have different thicknesses. One potential advantage of such a configuration is that the thicknesses of the individual layers can be adjusted based on weight, heat conductivity, heat dissipation, and braking properties.

In accordance with a seventeenth aspect of the invention, the bicycle disc brake rotor according to any one of the above aspects is configured so that the plural layers may be provided by a diffusion bonding process. One potential advantage of such a configuration is that hardness, structural strength, wear resistance, and corrosion resistance can be enhanced.

In accordance with a eighteenth aspect of the invention, the bicycle disc brake rotor has a rotational center axis and comprises an outer portion having plural layers including first and second braking surfaces in opposite axial directions. A fin is connected to one of the plural layers and made of a copper or a copper alloy. One potential advantage of such a configuration is that the heat conductivity of the fin is enhanced, and the exposed surface area of the outer layer for heat dissipation is increased.

In accordance with a nineteenth aspect of the invention, the bicycle disc brake rotor according to the eighteenth aspect is configured so that the plural layers may include the first layer, the second layer and the third layer. The second layer, the first layer, and the third layer may be stacked in this order in the axial direction, and the fin may be connected to the first layer.

In accordance with a twentieth aspect of the invention, the bicycle disc brake rotor according to the nineteenth aspect is configured so that the first layer may be made of a copper or a copper alloy. The second layer may be made of an iron or an iron alloy. The third layer may be made of an iron or an iron alloy. One potential advantage of such a configuration is that the heat conductivity and powerful braking properties of the copper or the copper alloy and the iron or the iron alloy are combined.

In accordance with a twenty-first aspect of the invention, the bicycle disc brake rotor according to the nineteenth or twentieth aspect is configured so that the fin and the first layer may be connected to each other as one piece member. One potential advantage of this configuration is that the number of manufacturing components may be reduced.

In accordance with a twenty-second aspect of the invention, the bicycle disc brake rotor according to any one of the eighteenth to twentieth-first aspects is configured so that the rotor may further comprise an inner portion radially inwardly arranged with respect to the outer portion, the inner portion having a first arm and a second arm coupled to the outer portion respectively. The fin may be arranged between the first arm and the second arm. One potential advantage of this configuration is that the arms are part of the inner portion rather than separate members from the inner portion, thereby reducing the number of manufacturing components.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

A selected embodiment of the present invention will now be described with reference to the accompanying drawings. It will be apparent to those skilled in the art from this disclosure that the following description of an embodiment of the invention is provided for illustration only and not for the purpose of limiting the invention as defined by the appended claims and their equivalents.

Figure 1:
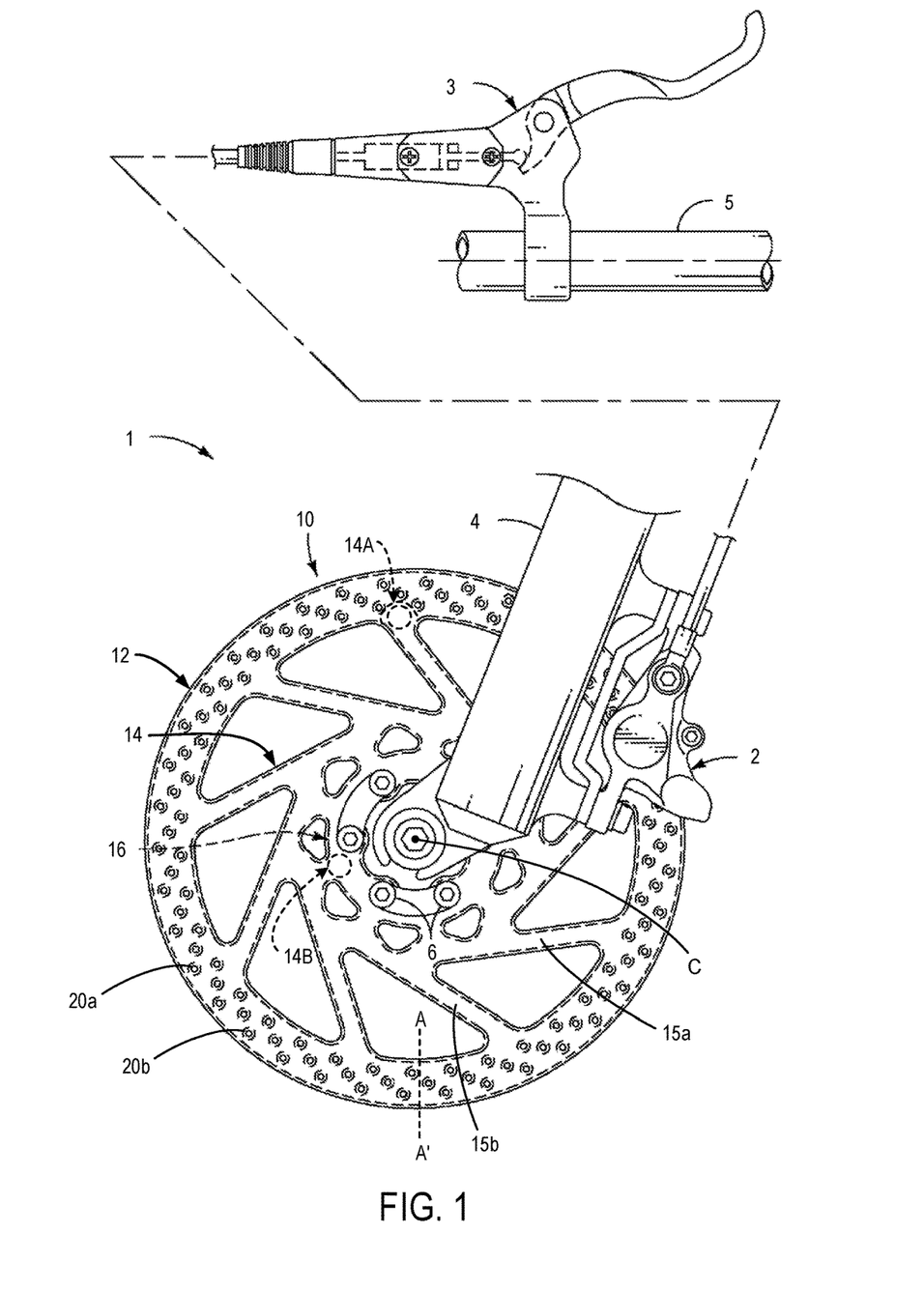
FIG. 1 illustrates a partial side elevational view of an exemplary bicycle disc brake rotor of a front disc brake system, according to one disclosed embodiment of the present invention.

Referring initially to FIG. 1, an exemplary bicycle disc brake rotor 10 of a front disc brake system 1 according to one disclosed embodiment of the present invention is shown. The front disc brake system 1 includes a bicycle disc brake caliper 2 and a brake operating (actuating) mechanism 3. The bicycle disc brake rotor 10 is fixedly attached to a bicycle hub of a bicycle wheel (not shown). The bicycle disc brake caliper 2 is mounted to a bicycle fork 4, while the brake operating mechanism 3 is attached to a bicycle handlebar 5. Except for the bicycle disc brake rotor 10, the operation and construction of the front disc brake system 1 is conventional and taught in prior art. Moreover, while the front disc brake system 1 is illustrated as a hydraulic braking system in this embodiment, it will be appreciated that the bicycle disc brake rotor 10 can be used with other types of braking systems as well.

The bicycle disc brake rotor 10 comprises an outer portion 12, an inner portion 14. The inner portion 14 extends radially inward from the outer portion 12. The inner portion 14 has a plurality of arms 15 (in FIG. 1, indicated as 15a and 15b) and a hub attachment part 16. The hub attachment part 16 is coupled to the inner ends of the arms 15 and configured to be mounted to a bicycle hub (not shown) by a plurality of fasteners 6. In this embodiment, the outer portion 12 and the inner portion 14 are integrally formed as a one-piece member of metal. However, in other embodiments, the outer portion 12, and the inner portion 14 may be separate pieces that are not integrally formed. For example, in some embodiments, at least one arm 15 may be separate from the outer portion 12, and the at least one arm 15 may be formed integrally with the hub attachment part 16. For example, as shown schematically at 14A, the arm 15 may be formed separately and later fastened to the outer portion 12 by attachment structure such as rivet or bolt. In such a configuration, all of the arms 15 are typically formed integrally with the hub attachment part 16, while being formed separately from the outer portion 12. However, other configurations are possible such as alternating the integrally-formed and fastener-attached sides of the arms 15 around the circumference of the bicycle disc brake rotor 10. In other embodiments, at least one arm 15 may be integral with the outer portion 12, and the at least one arm 15 may be formed separately and later fastened to the hub attachment part 16 by attachment structure such as a rivet or bolt, as illustrated at 14B. Typically, in such a configuration, all of the arms 15 are the typically formed integrally with the outer portion 12 and formed separately and fastened to the hub attachment part 16. However, as mentioned above, the integrally formed and fastener-attached sides of the arms 15 may be alternated, for example. As described above in the depicted embodiment, it will be appreciated that at least part of, and typically all of the arms 15 are formed to be integral with both the outer portion 12 and the hub attachment part 16. Further, at least one of the outer portion 12 and the inner portion 14 may include at least one through-hole 20 (in FIG. 1, indicated as 20a and 20b). In the depicted embodiment, multiple through-holes 20 are shown in the outer portion 12 to extend in an axial direction. The through holes 20 are distributed in substantially even density throughout the entire side surfaces of the outer portion 12. These through-holes 20 serve both to help air-flow to distribute heat caused by friction from braking, as well as lighten the outer portion 12.

Figure 2:
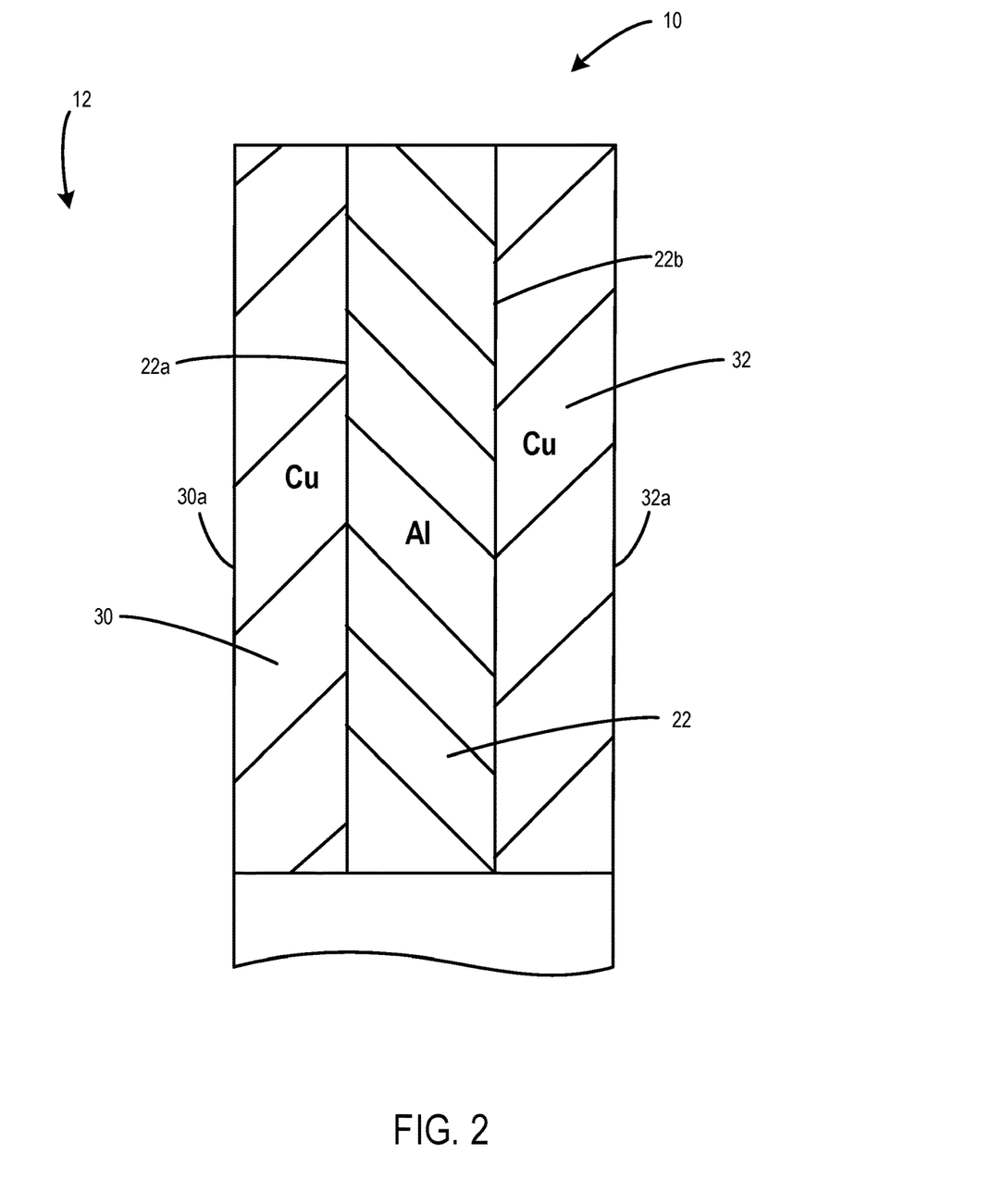
FIG. 2 illustrates an enlarged, partial cross sectional view of a portion of an exemplary bicycle disc brake rotor taken along line A-A' in FIG. 1, according to a first embodiment of the present invention.

A partial cross sectional view of a portion of the outer portion 12 of an exemplary bicycle disc brake rotor 10 is shown in FIG. 2, taken along the dotted line A-A' in FIG. 1 The bicycle disc brake rotor 10 has a rotational center axis C (FIG. 1). The plural layers of the outer portion 12 includes a first braking surface 30a and second braking surface 32a in opposite axial directions of the bicycle disc brake rotor 10. The plural layers include a first layer 30 made of a copper or a copper alloy (Cu), and further include a second layer 22 and a third layer 32 made of an aluminum or an aluminum alloy (Al). For the sake of illustration, the thicknesses of the layers have been exaggerated. The thickness of the first layer 30 may be 0.5 to 3 mm. The plural layers may each have different thicknesses. To enhance hardness, structural strength, wear resistance, and corrosion resistance, the plural layers may be provided by a diffusion bonding process, quench hardening process, and the like.

The first layer 30 at least partly overlies a first base surface 22a along the outer side of the second layer 22 to form a first braking surface 30a that is provided on the first layer 30. The third layer 32 at least partly overlies a second base surface 22b along the second layer 22 to form a second braking surface 32a that is provided on the third layer 32. In this way, the first layer 30, the second layer 22, and the third layer 32 are directly stacked in this order in the axial direction. Thus, the first and second braking surfaces 30a and 32a are directly contacted by brake pads of the bicycle disc brake caliper 2, respectively. In this embodiment, the first layer 30 and third layer 32 of the copper or the copper alloy are secured to the aluminum or the aluminum alloy core of the second layer 22 to provide the heat conductivity and powerful braking properties of the copper or the copper alloy and the heat dissipation of the aluminum or the aluminum alloy.

Figure 3:
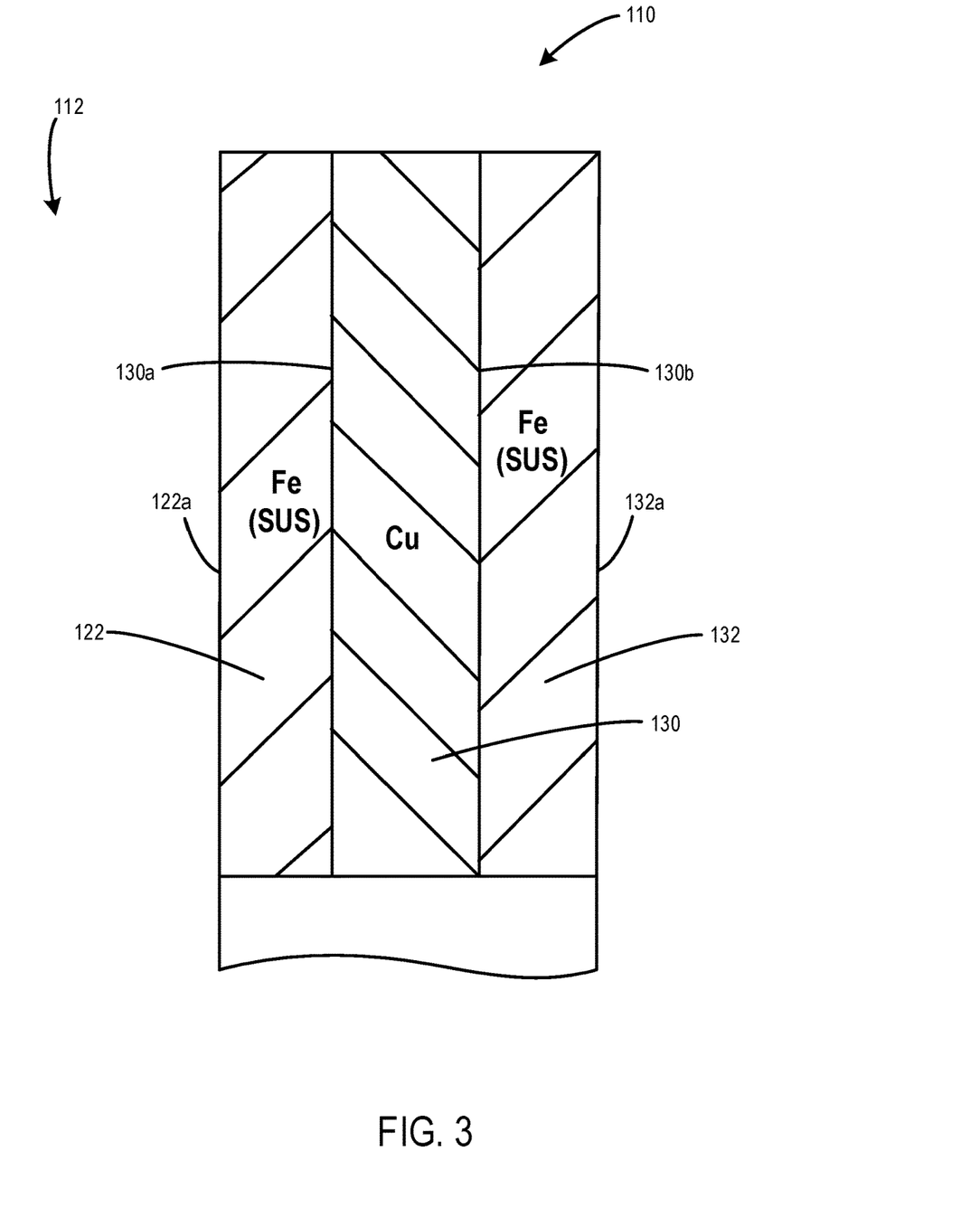
FIG. 3 illustrates an enlarged, partial cross sectional view of a portion of an exemplary bicycle disc brake rotor taken along line A-A' in FIG. 1, according to a second embodiment of the present invention.

Referring to FIG. 3, a disc brake rotor 110 in accordance with a second embodiment of the present invention will now be described. FIG. 3 corresponds to FIG. 2 and shows a partial cross-sectional view of a portion of the outer portion 112 of the bicycle disc brake rotor 110 taken along the dotted line A-A' in FIG. 1. Since the bicycle disc brake rotor 110 of the second embodiment is generally similar to the bicycle disc brake rotor 10 of the first embodiment with the exception of the materials of the plural layers and the order in which the plural layers are stacked in the axial direction, the detailed description thereof is abbreviated here for the sake of brevity. It is to be noted that like parts are designated by like reference numerals throughout the detailed description and the accompanying drawings.

As illustrated in FIG. 3, the second layer 122, the first layer 130, and the third layer 132 are stacked in this order in the axial direction between the first braking surface 122a and the second braking surface 132a. The second layer 122 is made of an iron or an iron alloy (Fe), and the third layer 132 is made of an iron or an iron alloy. The second layer 122 at least partly overlies a first base surface 130a along the outer side of the first layer 130 to form a first braking surface 122a that is provided on the second layer 122. The third layer 132 at least partly overlie a second base surface 130b along the first layer 130 to form a second braking surface 132a that is provided on the third layer 132. In this way, the second layer 122, the first layer 130, and the third layer 132 are directly stacked in this order in the axial direction. Thus, the first and second braking surfaces 122a and 132a are directly contacted by brake pads of the bicycle disc brake caliper 2. In this embodiment, the second layer 122 and third layer 132 of the iron or the iron alloy are secured to the copper or the copper alloy core of the first layer 130 to provide the heat dissipation and powerful braking properties of the iron or the iron alloy and the heat conductivity of the copper or the copper alloy. Here, in this embodiment, the iron alloy includes a stainless steel (SUS) and the second and third layers 122, 132 are made of the stainless steel.

Figure 4:
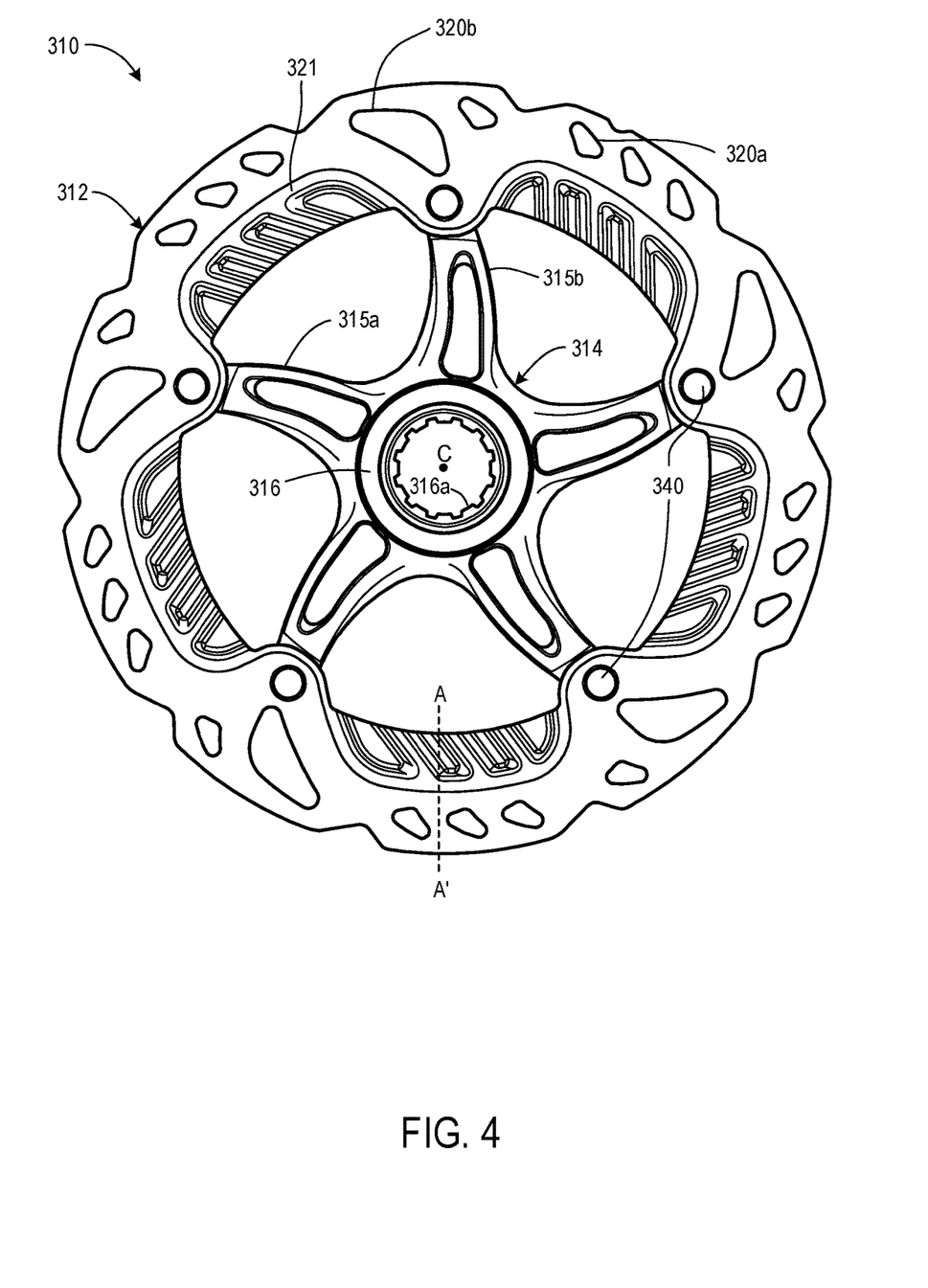
FIG. 4 illustrates a partial side elevational view of an exemplary bicycle disc brake rotor of a front disc brake system according to a third embodiment of the present invention.

Referring to FIG. 4, a bicycle disc brake rotor 310 in accordance with a third embodiment will now be described. It will be appreciated that the composition and stacking order of the plural layers in the outer portion 312 of the third embodiment are similar to those of the first embodiment as illustrated in FIG. 2. The bicycle disc brake rotor 310 rotates with the bicycle hub of the bicycle (not shown) about the center rotational axis C. The bicycle disc brake rotor 310 has an outer portion 312 and an inner portion 314. The inner portion 314 is arranged radially inward with respect to the outer portion 312. The inner portion 314 has a plurality of arms 315 coupled to the outer portion 312 respectively and a hub attachment part 316. The plurality of arms 315 at least includes a first arm 315a and a second arm 315b. A fin 321 is arranged between the first arm 315a and the second arm 315b. While the outer portion 312 is illustrated as being provided with attachment structures 340 such that the outer portion 312 and the inner portion 314 are separate parts that are attached together, it will be apparent that the outer portion 312 could alternatively be formed integrally with the inner portion 314. In this embodiment, the outer portion 312 is an outer annular or ring-shaped portion that defines a pair of friction braking surfaces. Further, at least one of the outer portion 312 and at least part of the inner portion 314 may include at least one through-hole 320 extending in the axial direction to expose the second layer 322 comprising an aluminum or an aluminum alloy. In the depicted embodiment, multiple through-holes 320 (in FIGS. 4 and 5, indicated as 320a and 320b) in different sizes are distributed throughout the outer portion 312. These through-holes 320 serve both to help air-flow to distribute heat caused by friction from braking, as well as lighten the outer portion 312. The hub attachment part 316 on the inner portion 314 has a hub attachment opening 316a with a plurality of serrations. However, the inner portion 314 may alternatively be coupled to a separate hub attachment part that is configured to be mounted to a bicycle hub assembly, like the first embodiment.

Figure 5:
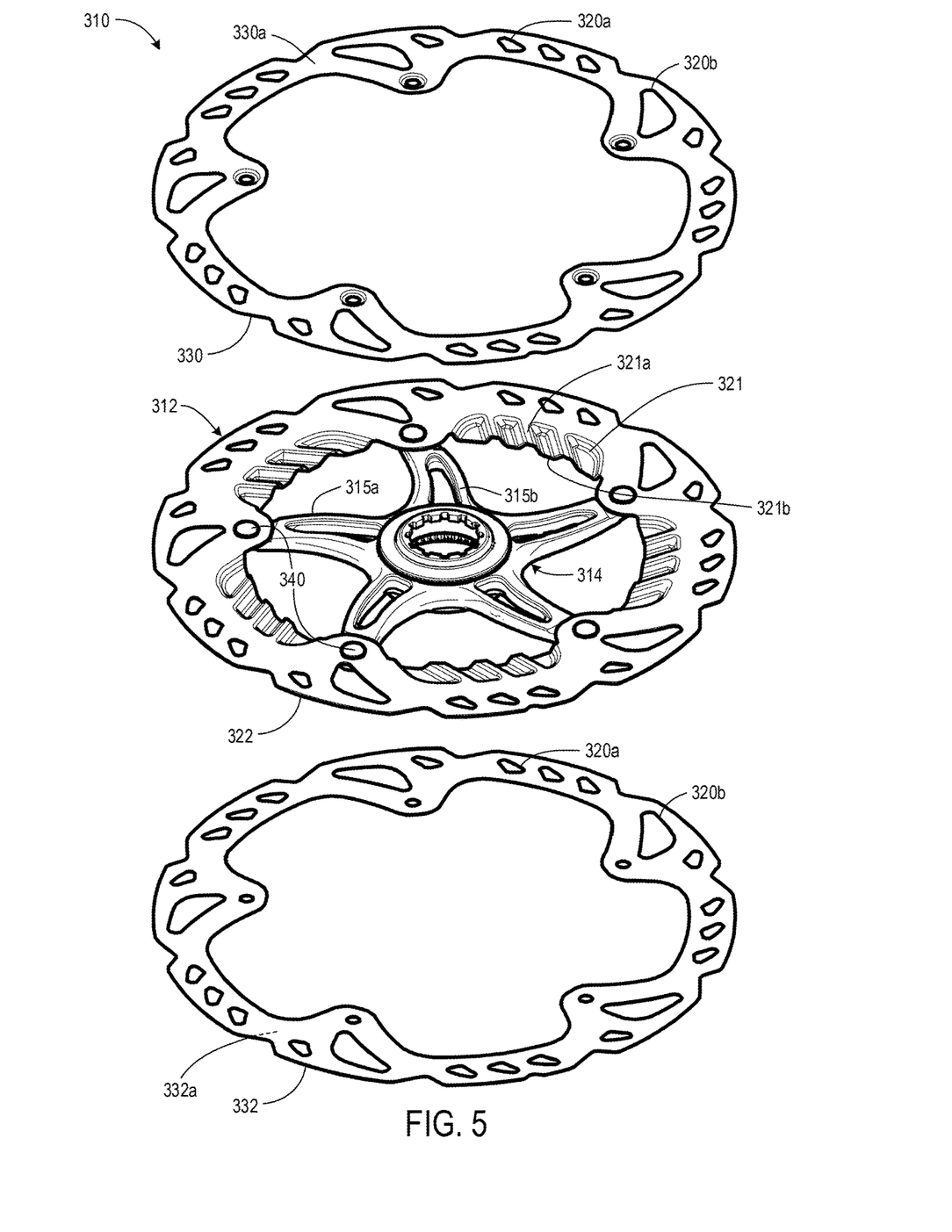
FIG. 5 illustrates an exploded view of an exemplary bicycle disc brake rotor according to the third embodiment of the present invention.

Referring to FIG. 5, an exploded perspective view of the bicycle disc brake rotor 310 in accordance with the third embodiment is described, illustrating each of the plural layers of the outer portion 312. The plural layers of the outer portion 312 include a first layer 330, a second layer 322, and a third layer 332 that are stacked in this order in the axial direction. In this embodiment, the first layer 330 and third layer 332 are made of a copper or a copper alloy and the second layer 322 is made of an aluminum or an aluminum alloy.

The plural layers also include a first braking surface 330a provided on the first layer 330 and a second braking surface 332a provided on the third layer 332 in opposite axial directions. In this embodiment, the second layer 322 extends in a radial direction of the bicycle disc brake rotor 310 with respect to at least one of the first layer 330 and the third layer 332 to form a fin 321, and the fin 321 is connected to the first layer 330 and the third layer 332 via the second layer 322. However, the fin 321 and the first layer 330 or the third layer 332 may alternatively be connected to each other integrally as a one piece member. Further, the fin 321 may be provided as a separate member with respect to the outer portion 312 and be arranged to be connected to the outer portion 312. In more detail, the fin 321 may be provided as a separate member with respect to the outer portion 312 and be arranged to be connected to at least one of the first to third layers 330, 322 and 332. The fins 321 may be provided with a plurality of ventilation ridges 321a and ventilation grooves 321b that are configured to facilitate the passage of air along the surface of the fins 321, thereby enhancing the heat conduction properties of the fins 321.

Figure 6:
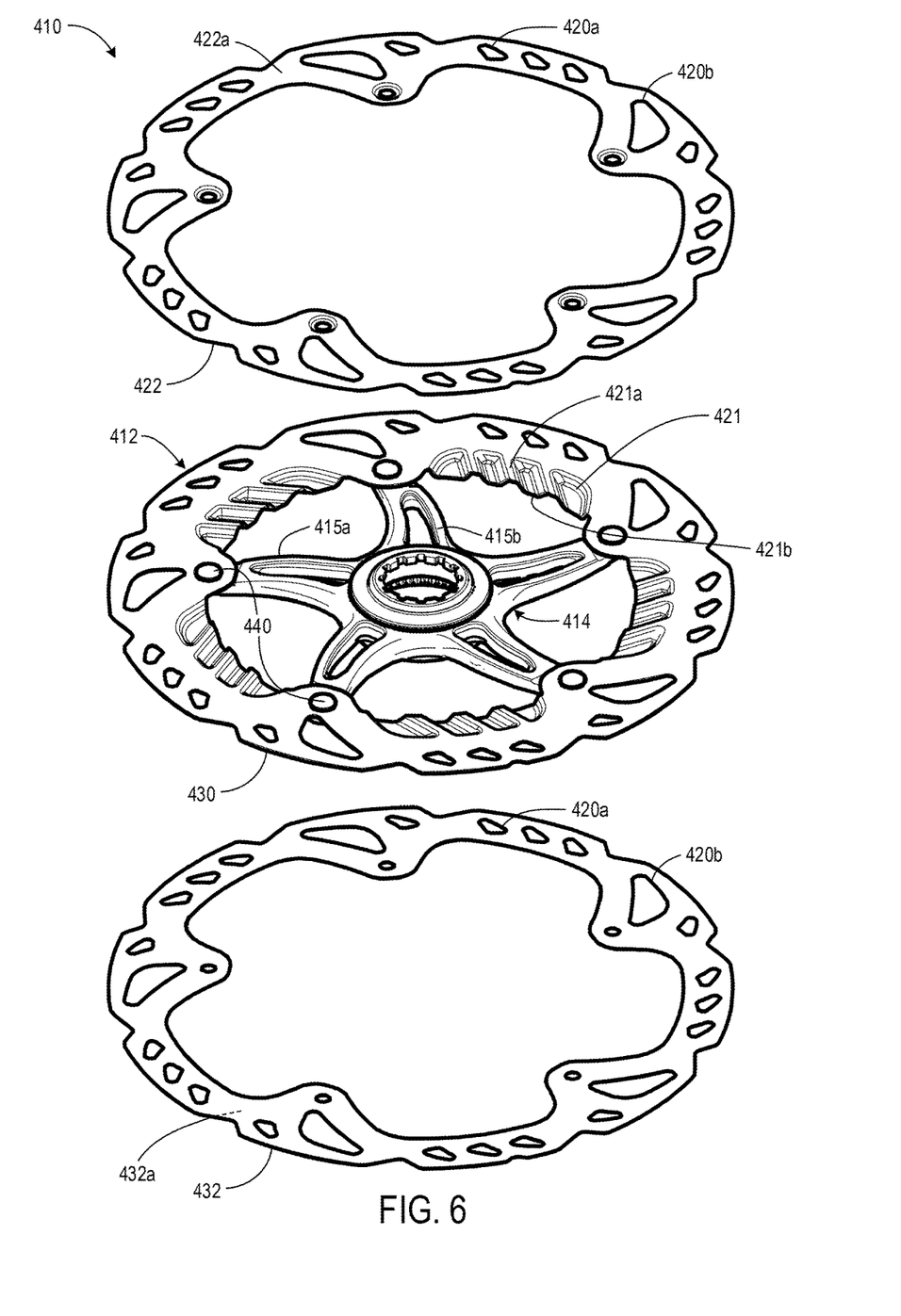
FIG. 6 illustrates an exploded view of an exemplary bicycle disc brake rotor according to a fourth embodiment of the present invention.

Referring to FIG. 6, an exploded perspective view of the bicycle disc brake rotor 410 in accordance with the fourth embodiment is described, illustrating the plural layers of the outer portion 412. Since the bicycle disc brake rotor 410 of the fourth embodiment is generally similar to that of the third embodiment with the exception of the materials of the plural layers, the order in which the plural layers are stacked in the axial direction, and the layer from which the fins are formed, the detailed description thereof is abbreviated here for the sake of brevity. It will also be appreciated that the composition and stacking order of the plural layers in the outer portion 412 of the fourth embodiment are similar to those of the second embodiment as illustrated in FIG. 3. It is to be noted that like parts are designated by like reference numerals throughout the detailed description and the accompanying drawings.

The plural layers of the outer portion 412 include a second layer 422, a first layer 430, and a third layer 432 that are stacked in this order in the axial direction. In this embodiment, the first layer 430 is made of a copper or a copper alloy and the second and third layers 422, 432 are made of an iron or an iron alloy. Here, in this embodiment, the iron alloy includes a stainless steel and the second and third layers 422, 432 are made of the stainless steel. The plural layers also include the first braking surface 422a provided on the second layer 422 and the second braking surface 432a provided on the third layer 432 in opposite axial directions. In this embodiment, the first layer 430 extends in a radial direction of the bicycle disc brake rotor 410 with respect to at least one of the second layer 422 and the third layer 432 to form at least one fin 421 (in FIG. 6, indicated as 421a and 421b), so that the first layer 430 and the fin 421 are integrally connected to each other as a one piece member. Thus, in this embodiment, the fin 421 is made of the copper or the copper alloy. However, the fin 421 may be provided as a separate member with respect to the outer portion 412 and be arranged to be connected to the outer portion 412. In more detail, the fin 421 made of the copper or copper ally may be provided as a separate member with respect to the outer portion 412 and be arranged to be connected to at least one of the first to third layers 430, 422 and 432. Further, at least one of the outer portion 412 and at least part of the inner portion 414 may include at least one through-hole 420 (in FIG. 6, indicated as 420a and 420b) extending in the axial direction to expose the first layer 430 comprising the copper or the copper alloy. The fin 421 is arranged between a first arm 415a and a second arm 415b of an inner potion 414 coupled to the outer portion 412 via attachment structures 440.

The above embodiments improve heat conductivity of a bicycle rotor and decrease its braking surface temperatures by configuring an outer portion with a first layer made of a copper or a copper alloy. As a further advantage according to the embodiment of the present invention, the structural strength and braking properties of the outer surface of the bicycle disc brake rotor are enhanced.

The term "comprising" and its derivatives, as used herein, are intended to be open ended terms that specify the presence of the stated features, elements, components, groups, integers, and/or steps. This concept also applies to words of similar meaning, for example, the terms "have", "include" and their derivatives.

The term "bicycle" and its derivatives, as used herein, are intended to be open ended terms that specify any vehicle or machine with a wheel that is propelled by the action of a cyclist's feet upon pedals, and encompasses outdoor bicycles, stationary bicycles, exercise cycles, indoor bicycles, and the like.

The terms of degree such as "approximately" as used herein mean a reasonable amount of deviation of the modified term such that the end result is not significantly changed (e.g., manufacturing tolerances).

While specific embodiments of the bicycle disc brake rotor have been described in detail, the particular arrangements disclosed are meant to be illustrative only and not limiting. The features of the various embodiments described above, as well as modifications thereof, may be variously combined without departing from the scope of this disclosure.

The invention claimed is:

1. A bicycle disc brake rotor having a rotational center axis, the bicycle disc brake rotor comprising:
    an outer portion having plural layers including first and second braking surfaces in opposite axial directions, wherein
    the plural layers include a first outermost layer made from a composition consisting of copper or a copper alloy;
    the first outermost layer forms an outermost surface of the bicycle disc brake rotor;

the copper alloy is a metal alloy consisting principally of copper;

the plural layers further include a second layer and a third layer; and at least one layer of the plural layers has a different thickness than at least another layer of the plural layers.

2. The bicycle disc brake rotor according to claim 1, wherein the first outermost layer, the second layer and the third layer are stacked in this order in the axial direction;

the second layer is made of aluminum or an aluminum alloy; and the third layer is made of copper or a copper alloy.

3. The bicycle disc brake rotor according to claim 2, wherein the first braking surface is provided on the first outermost layer; and the second braking surface is provided on the third layer.

4. The bicycle disc brake rotor according to claim 2, wherein the first outermost layer, the second layer and the third layer are directly stacked.

5. The bicycle disc brake rotor according to claim 2, wherein the second layer extends in a radial direction of the bicycle disc brake rotor with respect to at least one of the first outermost layer and the third layer to form a fin.

6. The bicycle disc brake rotor according to claim 5, further comprising:

an inner portion radially inwardly arranged with respect to the outer portion, the inner portion having a first arm and a second arm coupled to the outer portion respectively, wherein the fin is arranged between the first arm and the second arm.

7. The bicycle disc brake rotor according to claim 2, wherein the outer portion has a hole extending in the axial direction to expose the second layer.

8. The bicycle disc brake rotor according to claim 2, wherein the second layer, the first outermost layer and the third layer are stacked in this order in the axial direction between the first and second braking surfaces;

the second layer is made of iron or an iron alloy; and the third layer is made of iron or an iron alloy.

9. The bicycle disc brake rotor according to claim 8, wherein the first braking surface is provided on the second layer; and the second braking surface is provided on the third layer.

10. The bicycle disc brake rotor according to claim 9, wherein the first outermost layer, the second layer and the third layer are directly stacked.

11. The bicycle disc brake rotor according to claim 8, wherein the first outermost layer extends in a radial direction of the bicycle disc brake rotor with respect to at least one of the second layer and the third layer to form a fin.

12. The bicycle disc brake rotor according to claim 11, further comprising:

an inner portion radially inwardly arranged with respect to the outer portion, the inner portion having a first arm and a second arm coupled to the outer portion respectively, wherein the fin is arranged between the first arm and the second arm.

13. The bicycle disc brake rotor according to claim 8, wherein the outer portion has a hole extending in the axial direction to expose the first outermost layer.

14. The bicycle disc brake rotor according to claim 1, wherein the first outermost layer is 0.5 to 3 mm thick.

15. The bicycle disc brake rotor according to claim 1, wherein the plural layers are provided by a diffusion bonding process.

16. The bicycle disc brake rotor according to claim 1, wherein a thickness of the second layer is greater than respective thicknesses of the first outermost layer and the third layer.

* * * * *

UNITED STATES PATENT AND TRADEMARK OFFICE
CERTIFICATE OF CORRECTION

PATENT NO. : 10,352,382 B2
APPLICATION NO. : 15/221454
DATED : July 16, 2019
INVENTOR(S) : Takeshi Oi et al.

It is certified that error appears in the above-identified patent and that said Letters Patent is hereby corrected as shown below:

In the Claims

In Column 9, Claim 8, Line 40, delete "2" and insert --1--.

Signed and Sealed this
Tenth Day of September, 2019

Andrei Iancu
*Director of the United States Patent and Trademark Office*